March 9, 1948. O. SINGER 2,437,407
TRACK WHEEL FOR VEHICLES
Filed Aug. 12, 1946 4 Sheets-Sheet 1

Inventor
Otto Singer
By
Emery Holcombe & Blair
Attorney

March 9, 1948. O. SINGER 2,437,407
TRACK WHEEL FOR VEHICLES
Filed Aug. 12, 1946   4 Sheets-Sheet 2
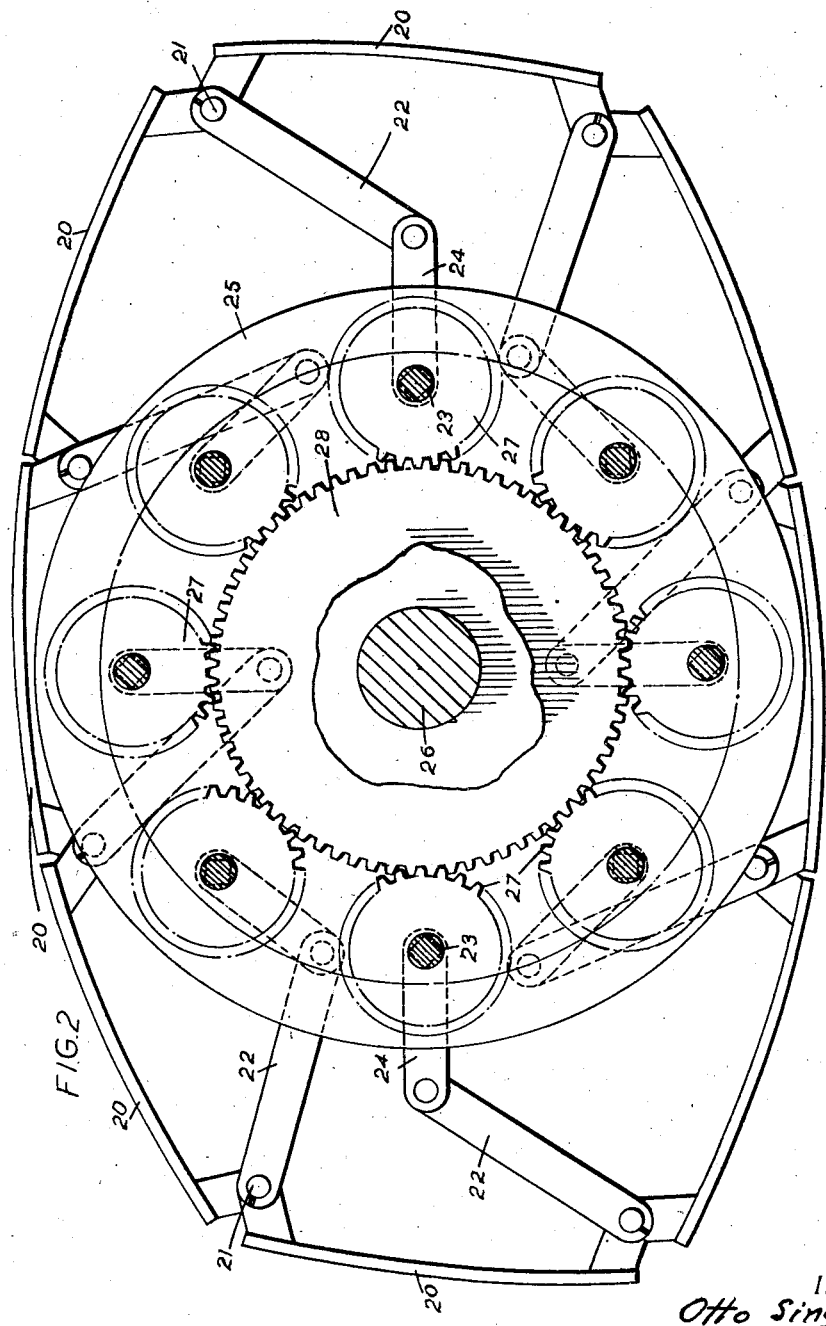
Inventor
Otto Singer
By
Emery, Holcombe & Blair
Attorney

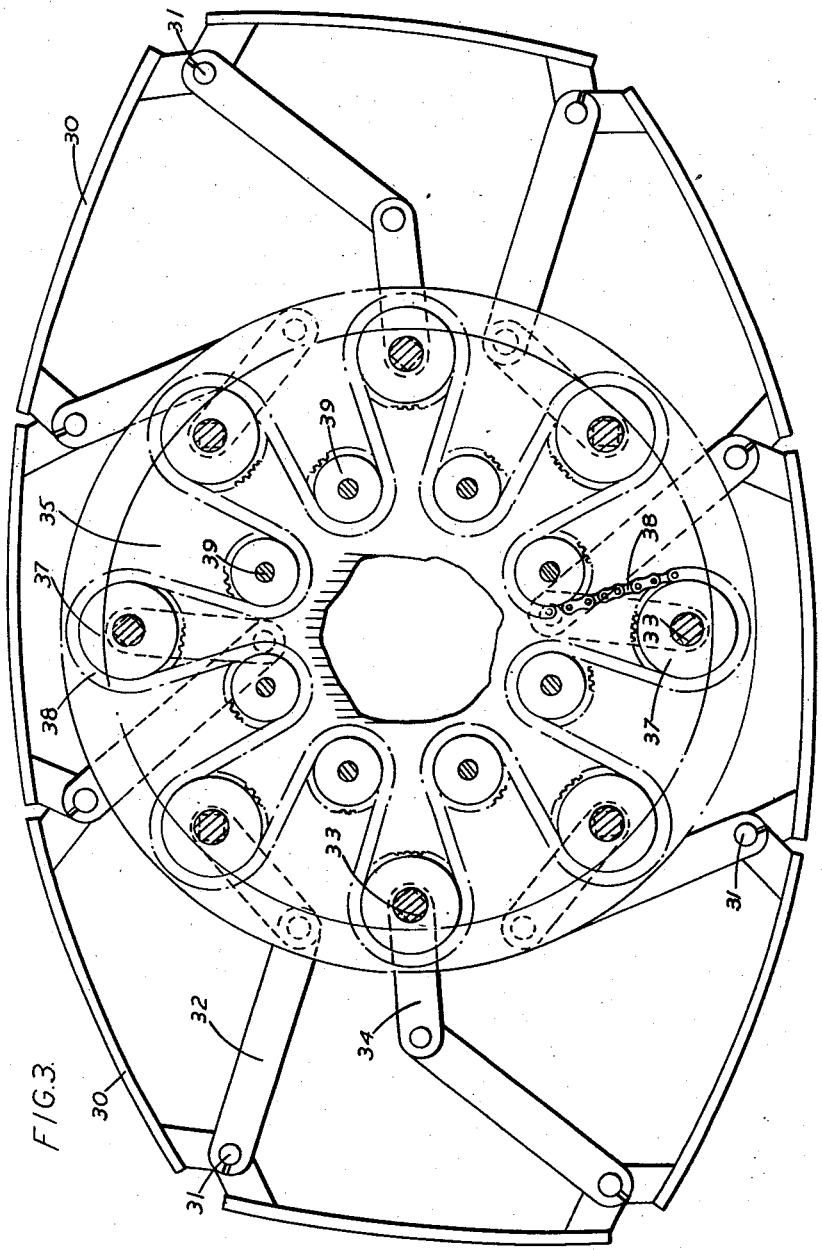

March 9, 1948. O. SINGER 2,437,407
TRACK WHEEL FOR VEHICLES
Filed Aug. 12, 1946 4 Sheets-Sheet 4
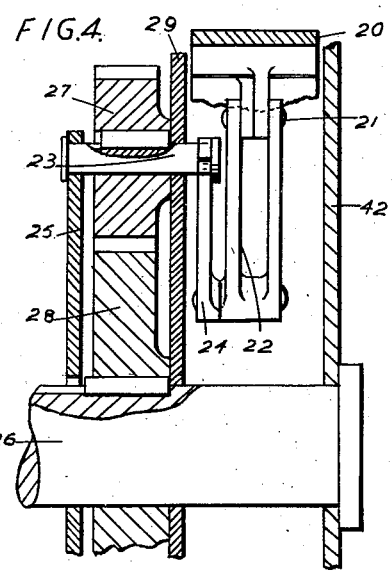
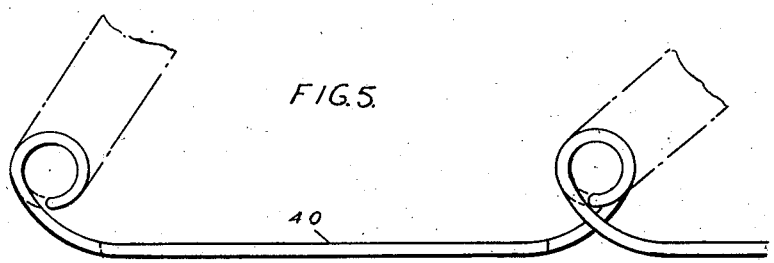
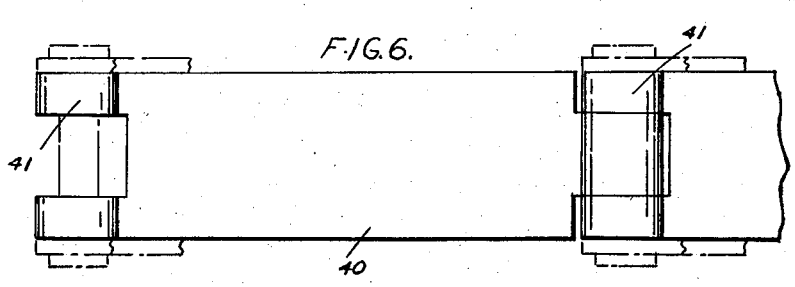
Inventor
Otto Singer
By
Emery, Holcombe & Blair
Attorney Patented Mar. 9, 1948

2,437,407

UNITED STATES PATENT OFFICE 2,437,407

TRACK WHEEL FOR VEHICLES

Otto Singer, London, England

Application August 12, 1946, Serial No. 689,936
In Great Britain August 22, 1945

6 Claims. (Cl. 305—6)

This invention relates to track wheels for vehicles, that is to say wheels which lay a track on the ground increasing the area of support or contact as compared with that of a normal wheel. In many such constructions hitherto used the track which is laid consists of linked elements on which wheels supporting the vehicle roll forward. Such track layers are noisy in use and have other disadvantages. Another type of track wheel is one which puts down a succession of feet on the ground. The device according to the present invention is like the latter of these known constructions in that there is no wheel running on a track, but is like the former in that what is laid is a continuous track or linkage giving a long bearing surface upon the ground. It is the object of this invention to provide a track wheel which will be equivalent to a wheel of large diameter rolling on the ground, and capable of transmitting a powerful tractive effort in the case of a driven wheel. Further objects are to provide a relatively simple construction in which any actuating mechanism such as gears or chains can be enclosed and protected, while there are no sliding parts which are liable to be obstructed by caked deposits, mud and the like. Another object is to reduce the noise made by rolling or travelling over a solid surface, particularly where joints are involved.

With these objects in view, a track wheel according to this invention comprises a set of track sections hinged together at their ends, a supporting member carrying a series of cranks each connected by a link to the joints between the track sections, or to points on those sections adjacent to their ends, and gearing interconnecting the cranks so as to control their movements as the track sections roll on the ground. The gearing may be toothed gears or chains and chain wheels for example. If the number of track sections is small the gears may be modified from a simple circular form so as to compensate for irregularities in the movement as the track sections roll on the ground. This is not essential however, particularly for slow-running vehicles such as agricultural tractors, and if the number of track sections is eight or more, any irregularity in the movement even if circular gears are used becomes negligible for most purposes.

The invention is illustrated by way of example in the accompanying drawings, in which:

Figure 2 is a similar view showing a geared system with a larger number of links controlled by circular gears.

Figure 3 is a similar view to Figure 2 showing the use of an endless chain belt passing round circular pinions and jockey wheels, to secure the same result.

Figure 4 is a cross section of a part of such a system as is shown in Figure 2.

Figure 5 is a side view, and

Figure 6 is a plan view of a modified form of track section.

Figure 1:
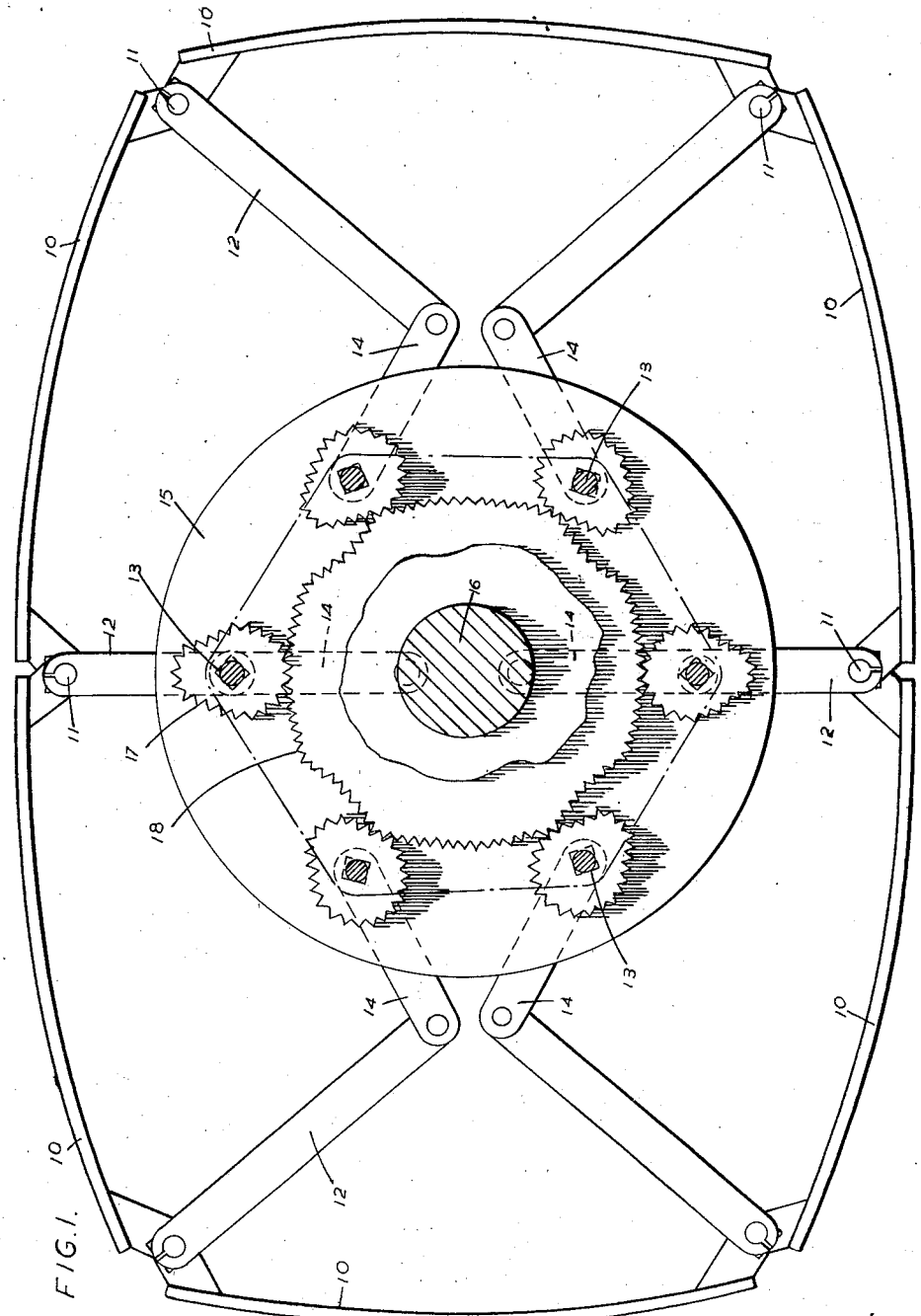
Figure 1 is a diagram showing a geared system having a small number of links controlled by gear wheels of particular shape.

Referring first to Figure 1, the track wheel there shown has six track sections 10 of curved form, hingedly connected at 11, one to another, and with links 12 extending from the hinges to cranks 14 supported on stub shafts 13. These shafts are carried in a supporting disc or hub 15 which may be suitably secured to or rotate upon an axle 16 of a vehicle. Each stub shaft 13 has fixed on it a pinion 17 of peculiar shape, all the pinions meshing with a single gear wheel 18 which is also of peculiar shape. The gear wheel 18 may be positively driven in the case of a power-driven wheel. It will be seen that, in the position of the parts shown in Figure 1, the uppermost crank 14 is downwardly directed, while the lowermost crank 14 is upwardly directed, so drawing the hinge joints 11 at the top down and at the bottom up toward the axle 16, while all other cranks 14 are outwardly directed, holding the other hinge joints spread out before and behind the axle. As the track sections roll upon the ground, the disc or hub 15 turns, and the gear wheel 18 turns somewhat faster than the disc or hub. For example the gear wheel 18 may have 96 teeth, while each pinion 17 has 24 teeth so that for one turn of each pinion the gear wheel makes a quarter turn with respect to the disc or hub 15. In this case the gear wheel 18 has four sections as shown convex in regard to the centre, and four intermediate sections of concave curvature, while each pinion 17 has a portion extending over rather more than half its circumference over which it is approximately circular, and a projecting portion over the rest of the circumference by which it meshes with the concave portion of the gear wheel 18. The teeth of course are somewhat irregular in shape in view of the lobed form of the pinions, but this presents no difficulty in the setting out of the gears.

With this arrangement as the disc 15 turns through 360°, each of the pinions 17 also turns through 360°, while the central gear wheel 18 turns through 90° with respect to the hub, i. e. 450° in all. It is preferable in a driven wheel to apply the drive to the central gear wheel 18 which gives a speed reduction in the ratio of 5:4 for one complete turn of the hub and for each cycle of engagements of the successive track sections 10 with the ground.

The axle 16 always moves to its lowest position with respect to the area of contact of the track sections 10 with the ground except when the wheels are being used on a tractor pulling a load, in which case the thrust on the ground will be in the direction of the resultant between the vertically acting weight and the horizontally acting pull, so that for an effective draw-bar pull the weight must be forward of the effective point of contact with the ground.

If a larger number of track sections can be used, for example 8 or more for a slow tractor, or 10 or more for a road vehicle, the forward motion of the wheel as the hub 15 or the gear 18 is turned is nearly uniform, although it is compounded of slightly varying forward movements as the shaped track sections roll upon the ground.

In Figure 2, the wheel has eight track sections 20, hinged together at 21, and controlled by links 22 pivoted on cranks 24 fixed to stub axles 23. These stub axles turn in disc or hub 25 which rotates on axle 26, and each carries a circular pinion 27 meshing with a central gear wheel 28. It will be seen that the cranks 24 are at angles of 45° to one another around the axle and they maintain this spacing as the track wheel runs on the ground while the gear wheel 28 rotates faster than the hub 25 at a speed dependent upon the numbers of teeth on the pinions and gear wheel respectively. The arrangement is similar for ten or more track sections, the cranks being at angles of 36° to one another for ten sections and 30° for twelve sections. The numbers of track sections can be odd or even and even numbers have only been chosen for the purpose of illustration.

In Figure 3, the wheel again has eight track sections 30, hinged together at 31, and controlled by links 32 pivoted on cranks 34 fixed to stub axles 33. These stub axles turn in a disc or hub 35, and carry sprocket wheels 37 over which passes an endless chain or link belt 38, the chain being carried under jockey wheels 39 between each sprocket wheel and the next so as to maintain effective engagement with the sprocket wheel teeth. In this construction the jockey wheels 39 may be geared together for driving by a toothed wheel engaging with pinions on the jockey wheel axles, but for a wheel not positively driven no such toothed wheel drive is required.

If the slight irregularities of the motion as the track wheel moves were to be compensated in this case, it could be done by mounting the jockey wheel axles on lever arms pivoted to the hub and acting upon them by cam surfaces which cause the jockey wheels to move inwards and outwards as required for accelerating and decelerating the motions of the sprockets 37. This is not recommended however, as it adds to the complication of the mechanism for a small correction which is unnecessary when a sufficient number of track sections is used.

Figure 4 shows what may be regarded as the axle 26 of Figure 2 with a toothed wheel 28 keyed thereon, a disc 25 turning freely around axle 26 and carrying the pinions 27 on stub axles 23. The stub axles are also supported in another disc 29, beyond which are the cranks 24 carrying links 22 connected to the hinges 21 of the track sections 20. The arrangement may be duplicated to the left of disc 25 and the track sections 20 may extend across from one side to the other over the discs 25 and 29 to make a balanced arrangement.

In place of rigid track sections flexible track sections can be used, or even a flexible steel band with pivot points at intervals which would approximate in curvature to the sum of the track sections under the action of the cranks and links connected at intervals to the steel band by suitable lugs.

In place of rigid links 12, 22, and 32 spring links may be used or flexible connections if these are placed under initial tension so that there is always some residual tension in them even when the weight is not acting to exert a pull upon them. If the track sections are made flexible in themselves they may eliminate the necessity for the use of springing between the vehicle and axle.

The actuating mechanism, whether gears or chains, can be enclosed in a casing so that it may run in a bath of oil and all access of dirt and foreign matter thereto is easily prevented. Part of such a casing is shown at 42 in Figure 4. Even if linked track sections are used it is possible to provide them with tyres of elastic material if preferred, and they may have projections for engaging with the ground, particularly in the case of wheels for tractors. If the axle is driven the suspension is of the floating type as between the body of the vehicle and the track, but an alternative form of drive is one in which a pinion or chain drives the hub or the central gear wheel from a centre displaced in relation to the axle, in which case the relation of the wheel to the vehicle, and the position of the track sections in relation to the vehicle, are more definitely predetermined.

Although the track sections have been generally referred to as being curved to a large radius of curvature, their engaging surfaces can be flat or even inwardly curved for some purposes, as for instance to give a more effective grip in a road making machine. Figures 5 and 6 show such track sections 40 hinged together at 41.

Again, the links connecting the cranks to the track sections are not necessarily pivoted to the link joints between the track sections but may be connected to these track sections at a little distance from the joints, by inwardly projecting lugs for example. By suitably accelerating and retarding the motions of the cranks in the parts of their movement when the track sections to which they are connected are raised from the ground, the figure formed by the connected track sections may be made to vary its form, though generally it will be of the shape of a longitudinally elongated polygon.

I claim:

1. A track wheel comprising a plurality of hingedly connected track elements, a hub member and a plurality of crank axles supported thereby, a crank on each such axle, a link connecting each such crank to a hinge joint between track elements, and gearing interconnecting such crank axles adapted to maintain pre-determined angular relations between the positions of the respective cranks as they rotate.

2. A track wheel comprising an endless track presenting hinge joints at intervals therein, a hub member and a plurality of crank axles supported thereby, a crank on each such axle, a link connecting each such crank to a hinge joint in said endless track, a unitary gear element and positive gearing between said unitary gear element and each such crank axle adapted to maintain predetermined angular relations between the positions of the respective cranks as they rotate.

3. A track wheel comprising an endless track presenting hinge joints at intervals therein, a hub member and a plurality of crank axles supported thereby, a crank on each such axle, a link connecting each such crank to a hinge joint in said endless track, a central gear wheel and pinions on said crank axles meshing with said central gear wheel in position such as to maintain predetermined angular relations between the respective cranks as they turn.

4. A track wheel comprising an endless track presenting hinge joints at intervals therein, a hub member and a plurality of crank axles supported thereby, a crank on each such axle, a link connecting each such crank to a hinge joint in said endless track, a central gear wheel having a plurality of outwardly curved portions connected by inwardly curved portions in its toothed circumference, a plurality of pinions, one on each said crank axle, each pinion having a lobe-shaped toothed circumference adapted to follow and mesh with the outwardly curved and inwardly curved portions of the circumference of said central gear wheel.

5. A track wheel comprising an endless track presenting hinge joints at intervals therein, a hub member and a plurality of crank axles supported thereby, a crank on each such axle, a link connecting each such crank to a hinge joint in said endless track, a central gear wheel and pinions on said crank axles meshing with said central gear wheel in position such as to maintain predetermined angular relations between the respective cranks as they turn, the relative sizes of such central gear wheel and said pinions being such that said central gear wheel rotates faster than said hub as the track wheel progresses.

6. A track wheel comprising an endless track presenting hinge joints at intervals therein, a hub member and a plurality of crank axles supported thereby, a crank on each such crank axle, a link connecting each such crank to a hinge joint in said endless track, and means enabling such cranks and links to support and control the movements of the endless track about said hub member, said means comprising a unitary gear element and positive gearing between said unitary gear element and each of said crank axles.

OTTO SINGER.